J. V. ROBINSON.
AUTOMATIC TRAIN PIPE COUPLING.
APPLICATION FILED APR. 1, 1914.

1,245,794.

Patented Nov. 6, 1917.

Witnesses
B. M. Offutt
C. E. Denny

Inventor
Joseph V. Robinson

By J. A. Watson

Attorney

UNITED STATES PATENT OFFICE.

JOSEPH V. ROBINSON, OF CHEVY CHASE, MARYLAND.

AUTOMATIC TRAIN-PIPE COUPLING.

1,245,794. Specification of Letters Patent. Patented Nov. 6, 1917.

Original application filed December 19, 1912, Serial No. 737,728. Divided and this application filed April 1, 1914. Serial No. 828,876.

*To all whom it may concern:*

Be it known that I, JOSEPH V. ROBINSON, a citizen of the United States, and a resident of Chevy Chase, county of Montgomery, State of Maryland, have invented certain new and useful Improvements in Automatic Train-Pipe Couplings, of which the following is a specification.

This is a division of my application Serial Number 737,728, filed December 19th, 1912, for improvements in automatic train pipe couplers, and the invention herein described has for its object to provide an improved gasket adapted for use particularly with automatic train pipe connectors, and which will accommodate itself to the gapping and opening-up of the connector heads in rounding curves, etc., in service, and maintain an efficient joint at all times.

The invention consists in the combinations, arrangements and improvements hereinafter described, pointed out in the appended claims and illustrated in the accompanying drawings, in which:

Figure 1:
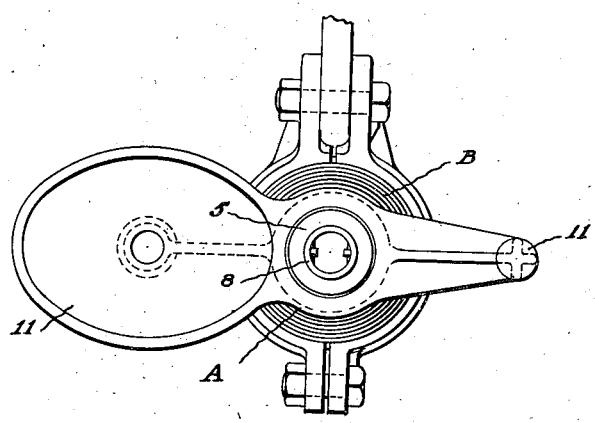
Figure 1, is a face view of an automatic train pipe connector showing my improved gasket attached thereto.
Figure 2:
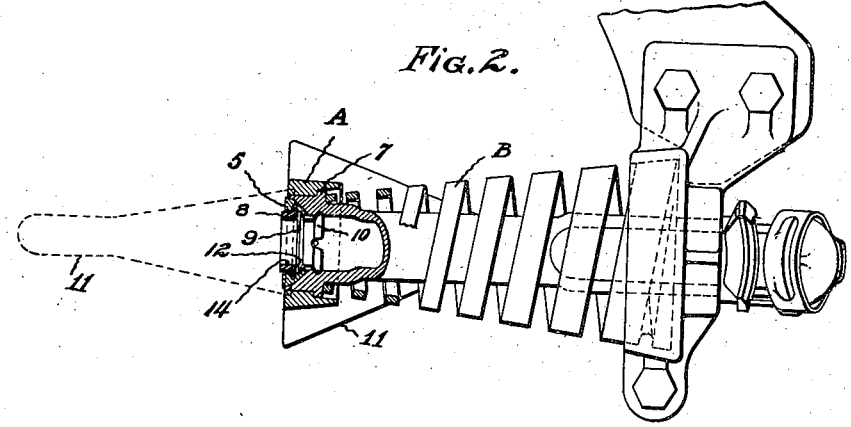
Fig. 2, is a sectional view of the gasket applied to an automatic train pipe connector.

Referring to the drawings: My improved gasket may be used with any satisfactory form of connector head A and it may be mounted in the face of the head or in a fluid conduit extending through the head or connected therewith. Any of the several well-known forms of support for carrying the automatic connector may also be used. A satisfactory form of such support I indicate at B.

More particularly, my improvement comprises a gasket 5 having a partly spherical convex rear face seated in a complementary socket in the end of a fluid conduit or port 6 of the connector head. The conduit extends through the head and is provided with an annular seat 7 against which the support B acts in service. In coupling, the gasket 5 mates with a correspondingly shaped gasket in a counterpart head and to insure against possible leakage, I provide the gasket with an auxiliary gasket or sealing member 8, preferably of resilient material and which also mates with a corresponding gasket in coupling and is mounted in an undercut seat 9 in the first mentioned gasket. I retain the gasket 5 in the conduit 6 by a retaining ring 10 of suitable construction interlocked with the conduit and the gasket, as shown.

The gasket 5 projects beyond the front face of the coupling head B and as aforesaid, is mounted in the fluid conduit or pipe 6 which produces a construction of gasket and pipe that relieves the head B of all buffing strains occurring at final register of the heads in coupling and which produces a single bearing point for the head that is confined within an area approximating the diametrical area of the forward end of the pipe or port 6, whereby in rounding curves and the like the interlocking effect of the guiding members 11 on mating connector heads is greatly augmented.

Figure 3:
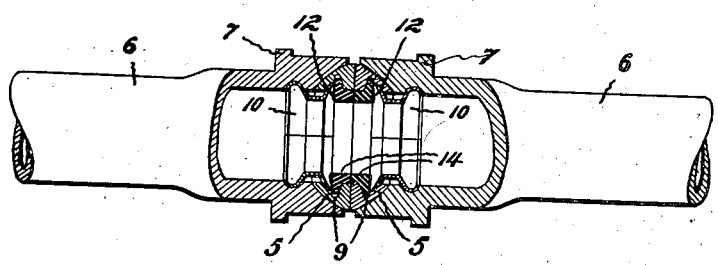
Fig. 3, is a horizontal sectional view showing two of my improved gaskets in engagement.

It will be observed that the gasket 8 is adjusted bodily by the gasket 5 to any relative rocking movement occurring between coupled heads and is air extended axially and radially into tight contact with the non-yielding walls of said gasket 5, this being due to the air pressure in the pipe 6 acting against the face of the gasket 8 at 12, and against the inner face 14 thereof. (See particularly Fig. 3.) Thus the faces of coupled connector heads provided with my improved gasket may rock one upon the other considerably and a considerable amount of angular movement occur between them without in any degree destroying the air tight connection between mating gaskets 5 and 8.

Having thus described my said invention, what I claim as new and desire to secure by United States Letters Patent is:

1. In a train pipe coupling, the combination of a fluid conducting member, a main gasket mounted in a seat at one end of said member to have universal movement therein and provided with an annular groove in its inner surface, and a supplemental, flexible, gasket arranged within the main gasket and having its rear end extending into said groove, for the purpose described.

2. A train pipe coupling comprising two similar members each having a fluid conduit provided at one end with a concave seat, a main gasket having a convex rear end fitted to said seat and having its other end projecting beyond the end of the fluid conduit, and a supplemental, flexible, gasket arranged within the forward end of the main gasket and adapted to be retained in close engagement with the surrounding wall of the main gasket by fluid pressure within the conduit.

In testimony whereof, I have hereunto set my hand in the presence of two witnesses.

JOSEPH V. ROBINSON.

In the presence of—
M. H. BRAKHAGEN,
ARTHUR L. BRYANT.